United States Patent [19]

Amino

[11] Patent Number: 4,715,775
[45] Date of Patent: Dec. 29, 1987

[54] 180 DEGREE INVERTING MACHINE

[75] Inventor: Hiroyuki Amino, Shizuoka, Japan

[73] Assignee: Amino Iron Works Co., Ltd., Shizuoka, Japan

[21] Appl. No.: 727,902

[22] Filed: Apr. 26, 1985

[30] Foreign Application Priority Data

Oct. 17, 1984 [JP] Japan .............................. 155810[U]

[51] Int. Cl.$^4$ .............................................. B25B 11/00
[52] U.S. Cl. ...................................... 414/758; 269/60; 269/71; 269/74; 414/779
[58] Field of Search .............. 414/758, 779; 254/3 C, 254/92, 3 R; 269/71, 73, 74, 59, 60

[56] References Cited

U.S. PATENT DOCUMENTS

| | | | |
|---|---|---|---|
| 2,227,688 | 1/1941 | Wood | 269/71 X |
| 2,522,037 | 9/1950 | Hall | 414/758 X |
| 2,545,953 | 3/1951 | Hall | 269/71 X |
| 3,827,682 | 8/1974 | Foster, Sr. et al. | 414/758 X |
| 3,932,082 | 1/1976 | Beaman | 269/71 X |
| 4,523,670 | 6/1985 | Yanagisawa et al. | 414/758 X |

FOREIGN PATENT DOCUMENTS

| | | | |
|---|---|---|---|
| 594008 | 2/1978 | U.S.S.R. | 414/758 |
| 776923 | 7/1980 | U.S.S.R. | 414/758 |

Primary Examiner—Robert J. Spar
Assistant Examiner—Janice Krizek
Attorney, Agent, or Firm—Michael J. Striker

[57] ABSTRACT

An inverting machine for inverting metal molds 180° including a bed, a stationary table on the bed, a pair of portal uprights standing on the table's lateral sides, a pair of slide frames slidably movable along the uprights, an inverting table provided between the slide frames and having a fixed securing element for holding a metal mold to be inverted, the inverting table being arranged in opposition to the stationary table, and a central shaft being pivotally supported by the slide frames and extending from a center of the width of each side of the inverting table. The ends of the central shaft are pivoted to rotate the inverting table about the central shaft. The slide frames are moved vertically relatively to the uprights. Pivoting and vertical moving may be done concurrently.

22 Claims, 34 Drawing Figures

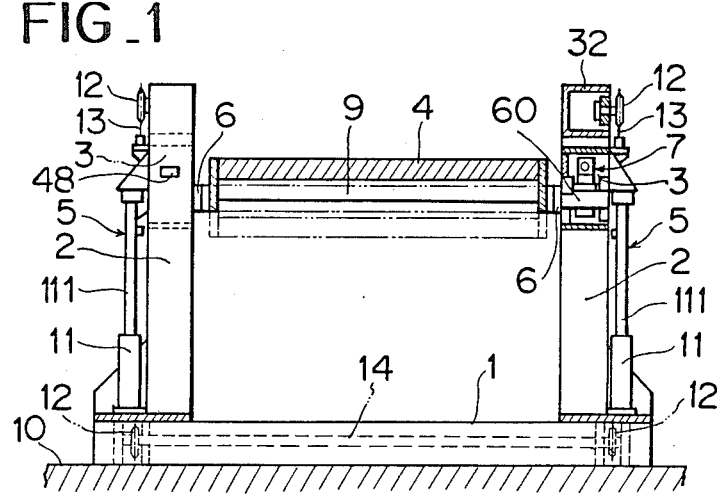
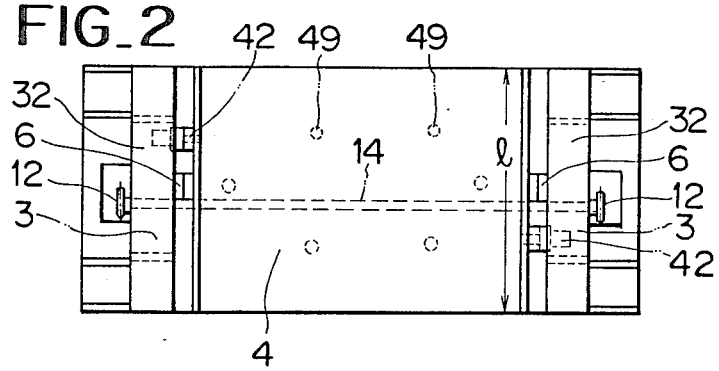
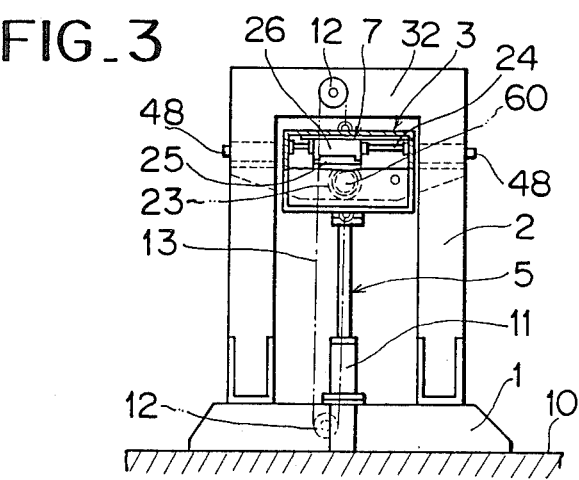

FIG_4
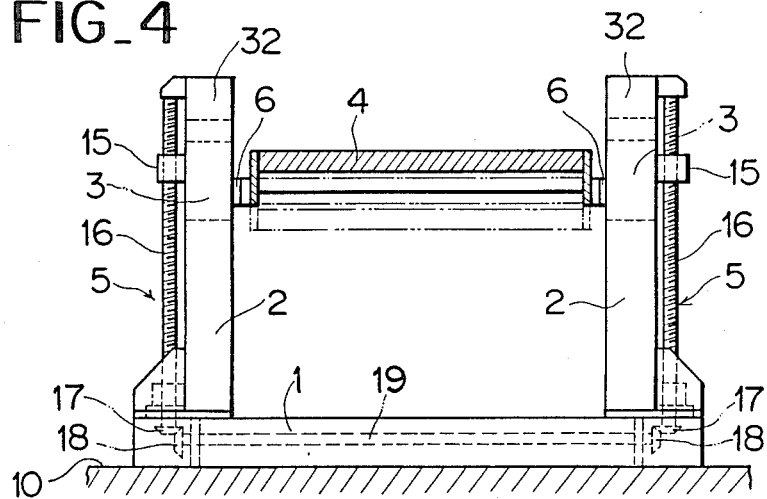
FIG_5
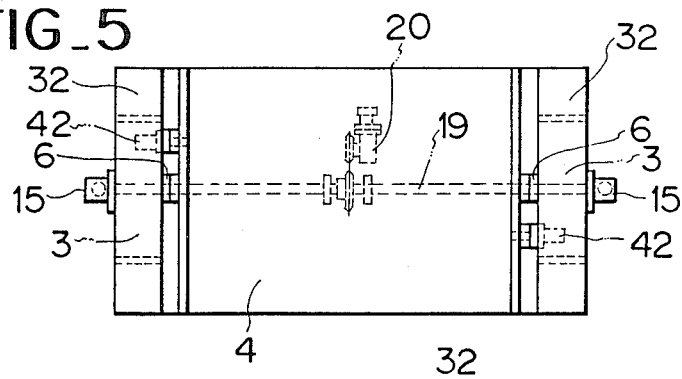
FIG_6
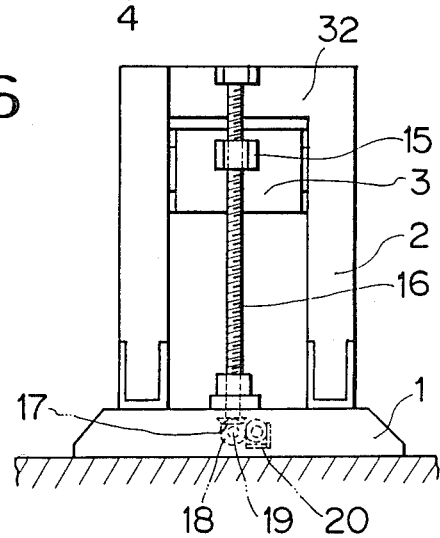

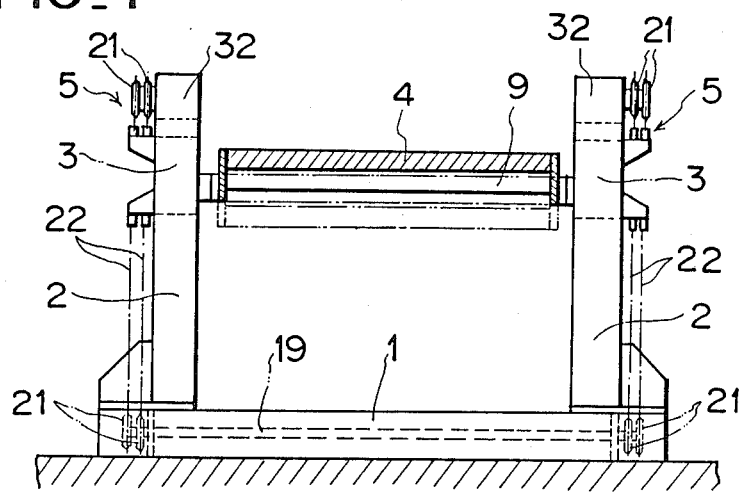
FIG_7
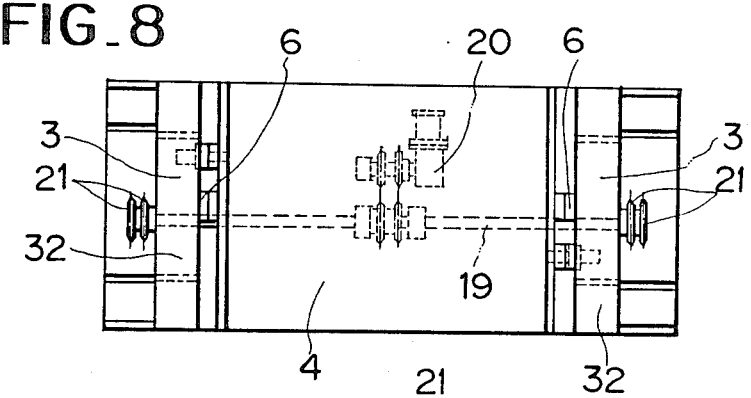
FIG_8
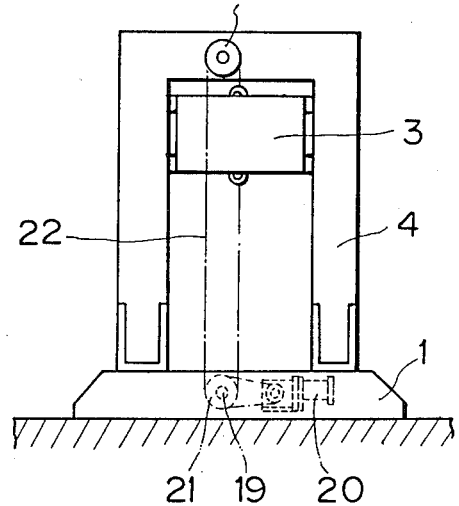
FIG_9

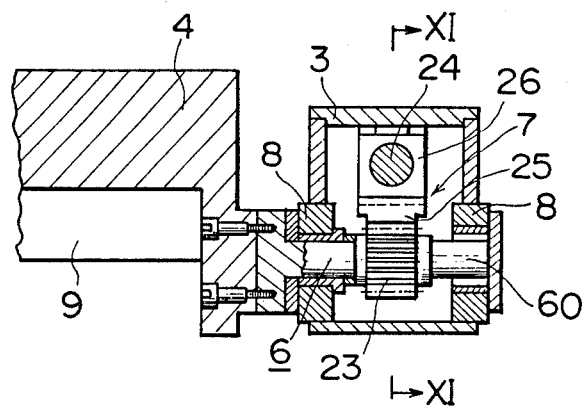
FIG_10
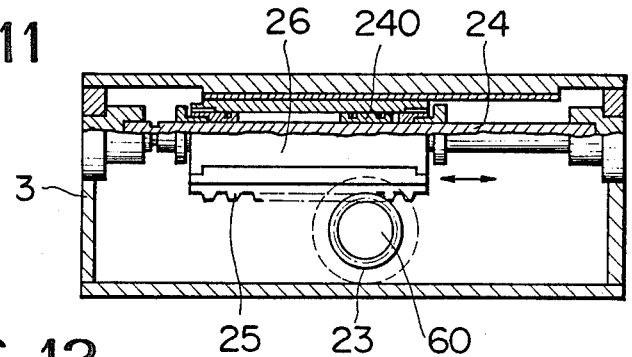
FIG_11
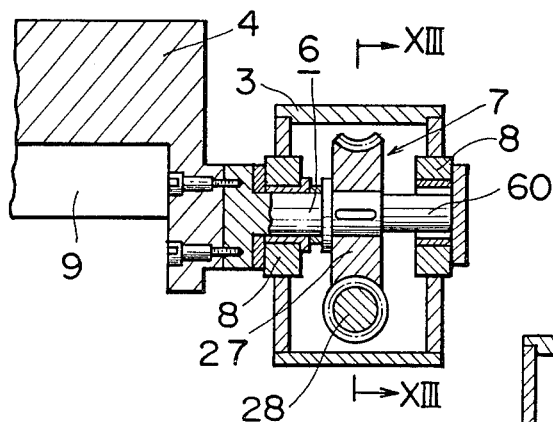
FIG_12
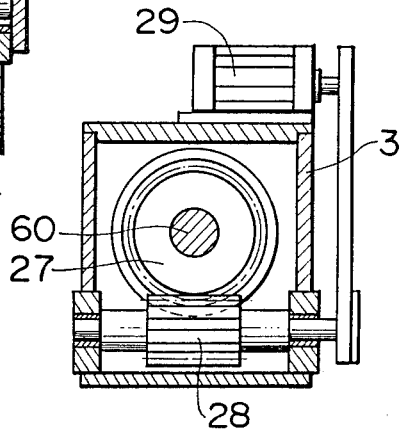
FIG_13

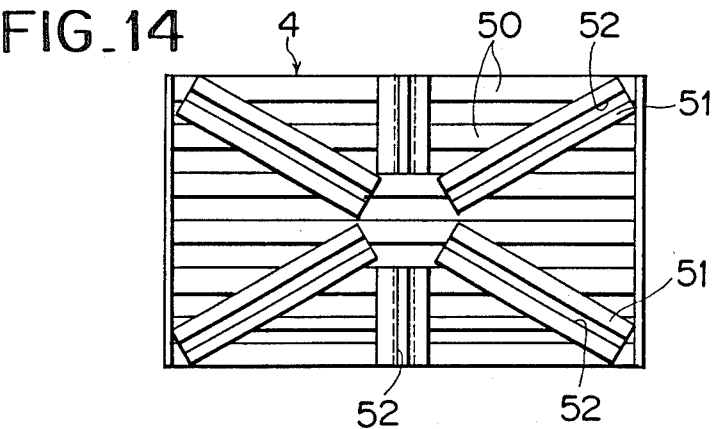
FIG_14
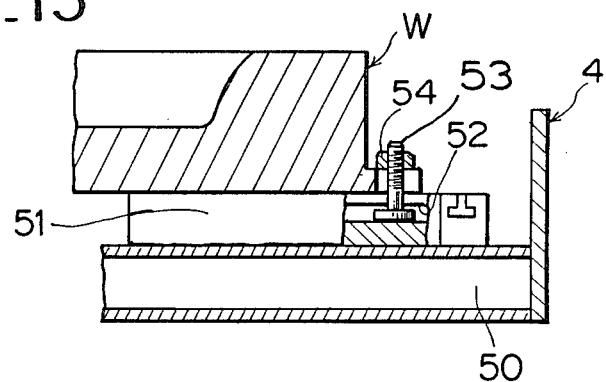
FIG_15
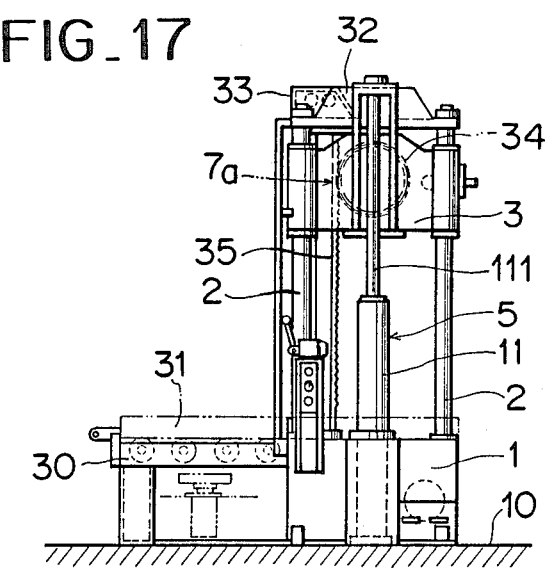
FIG_17

FIG_16(a)
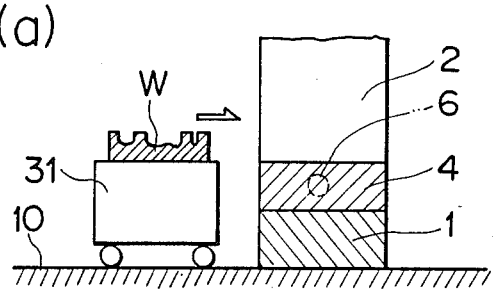
FIG_16(b)
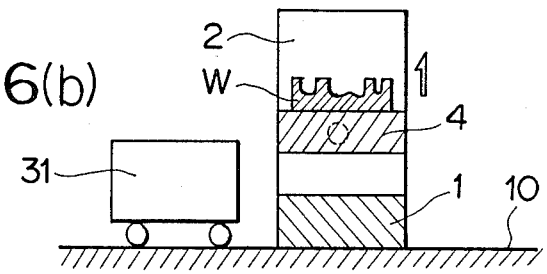
FIG_16(c)
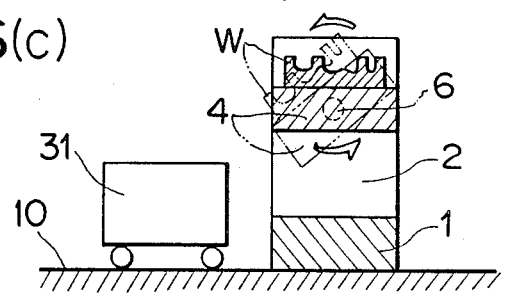
FIG_16(d)
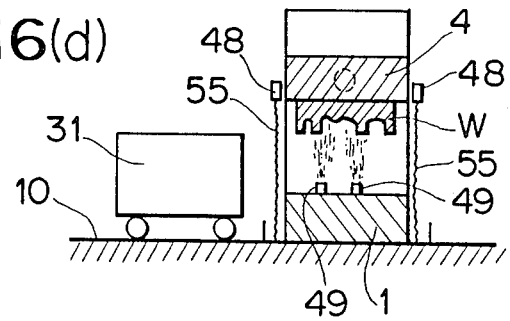

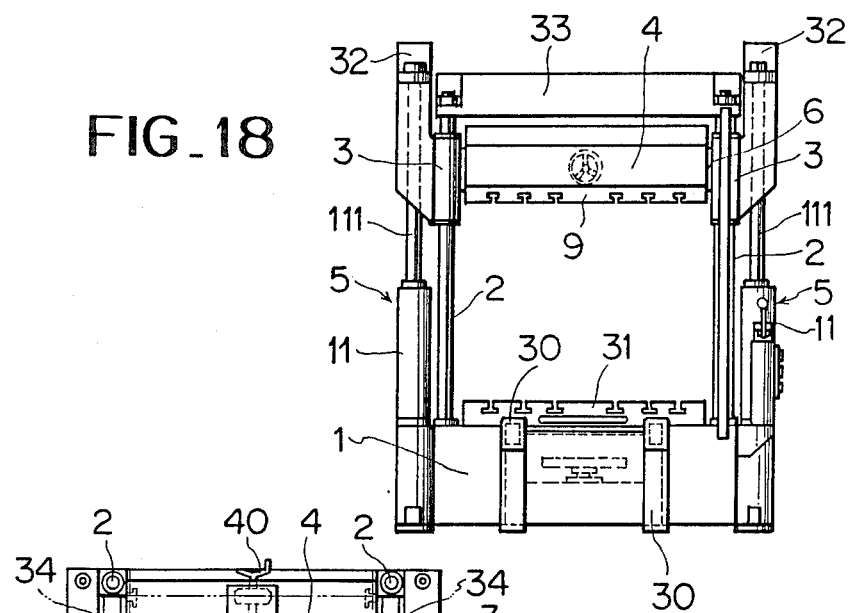
FIG_18
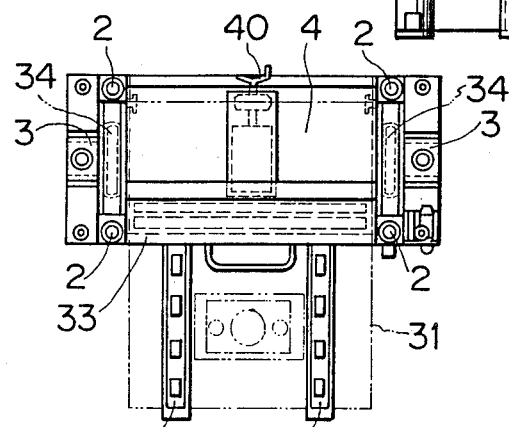
FIG_19
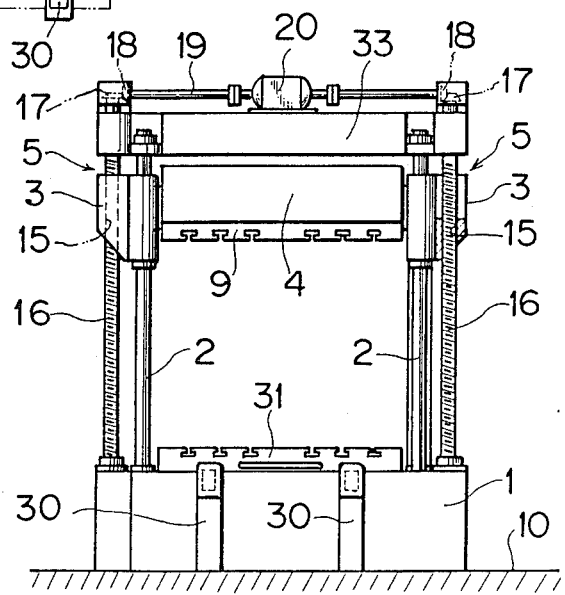
FIG_20

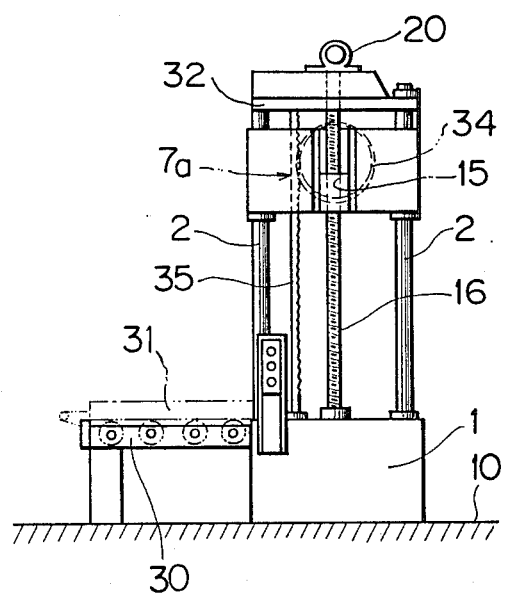
FIG_21
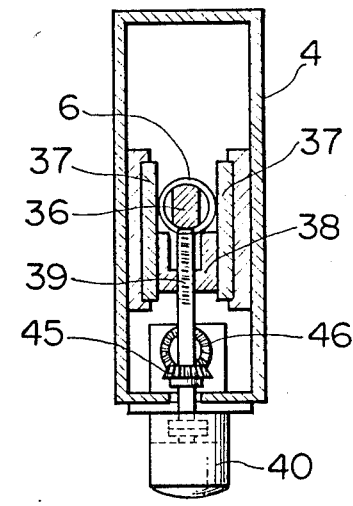
FIG_23
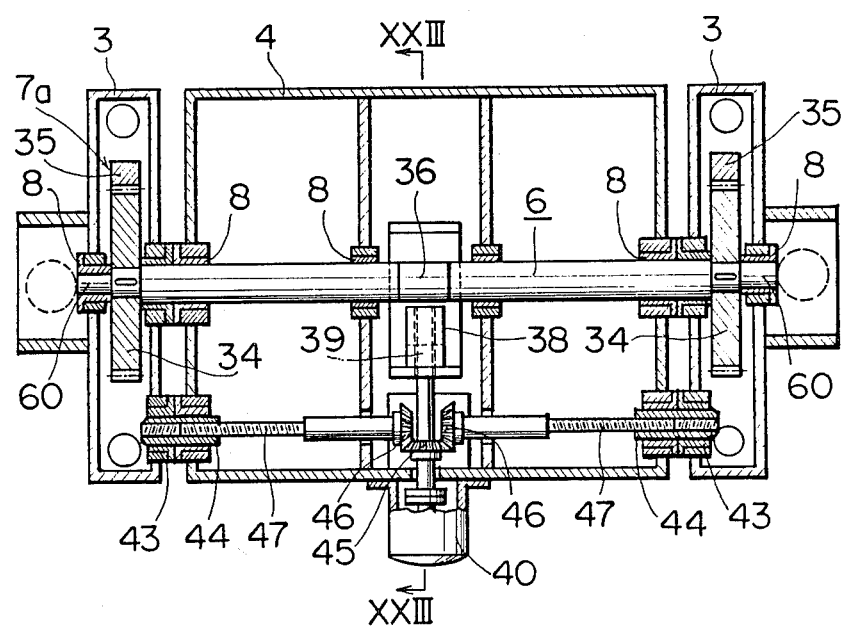
FIG_22

FIG._25
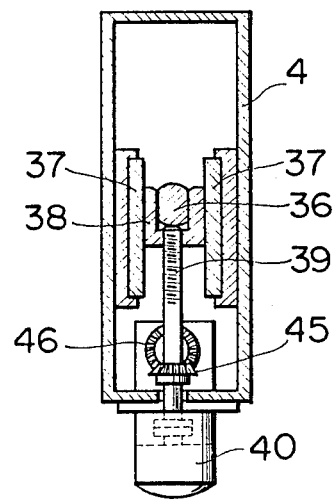
FIG._27
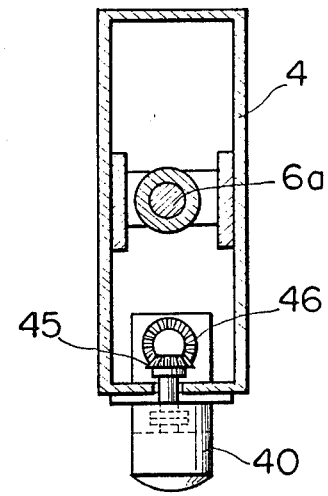
FIG._24
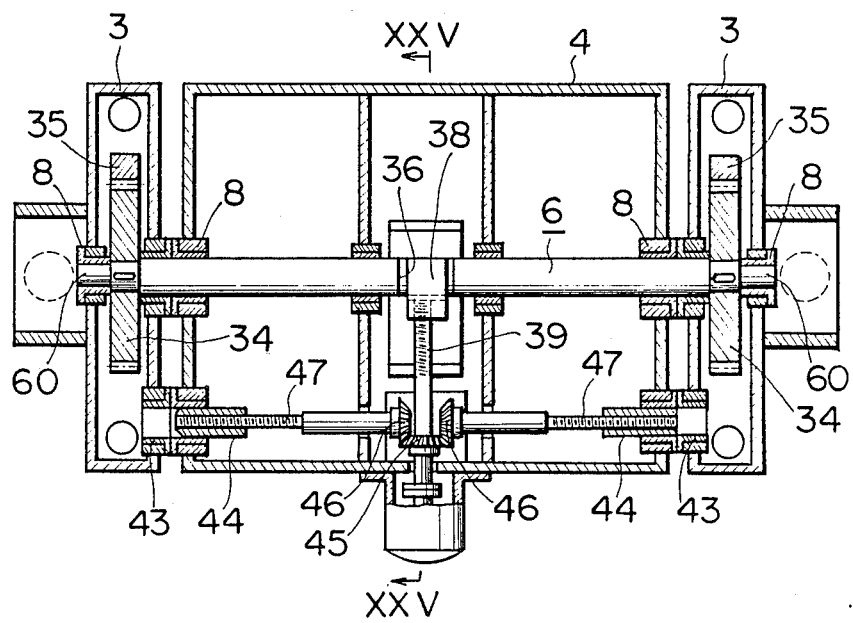

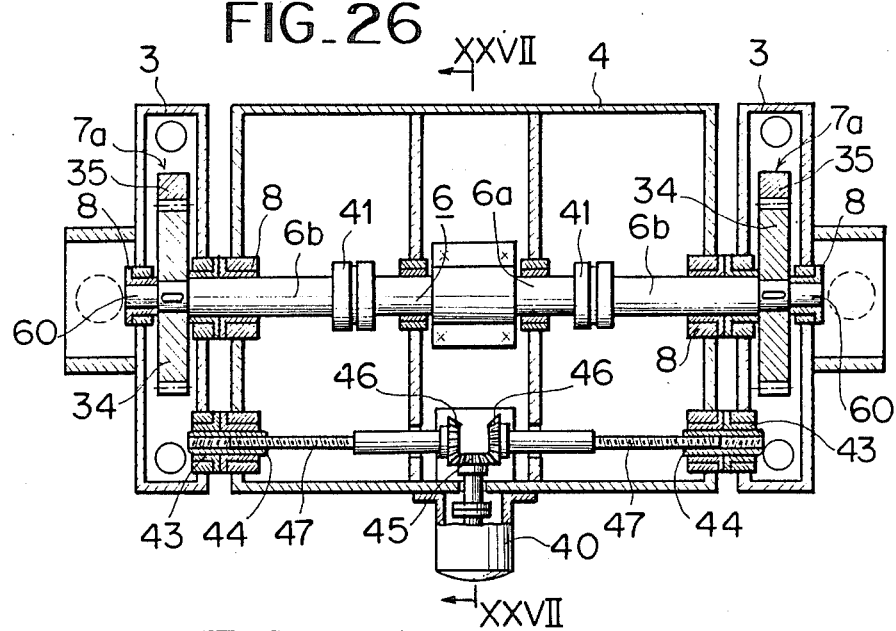
FIG_26
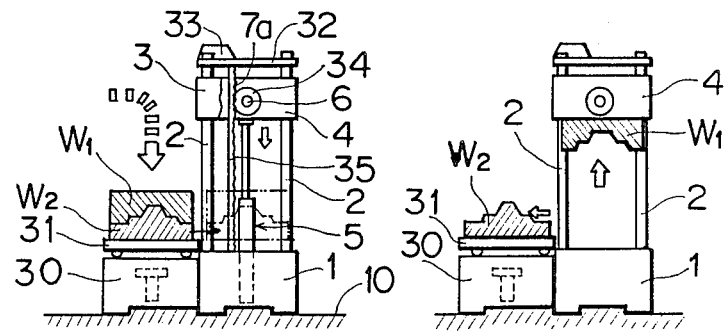
FIG_28(a)  FIG_28(b)
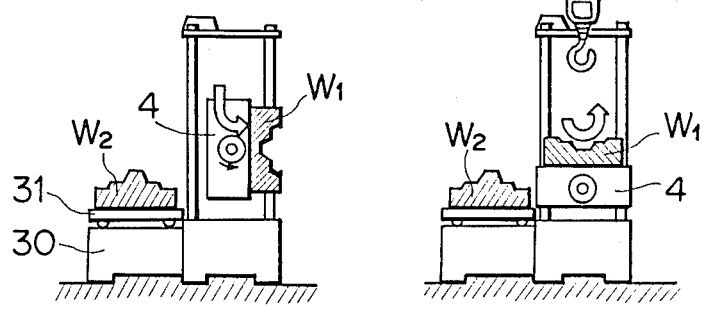
FIG_28(c)  FIG_28(d)

180 DEGREE INVERTING MACHINE

FIELD OF THE INVENTION

BACKGROUND OF THE INVENTION

This invention relates to a 180° inverting machine, and more particularly to an apparatus which inverts 180° a large scale and heavy material such as a metal mold, a processing medium, machines, products and others.

In the working shops, for example, metal mold processing factory, press factory or resin forming factory, such works are undertaken of inverting 180° an upper part of the metal mold for finishing, assembling and dismantling, preserving, checking, mending or cleaning thereof as products or processing means of other materials. Other products than the metal mold or mechanical parts are lifted and turned over for treating them.

Those materials are heavy in weight, and it requires much human power to turn them 180° upside down. Conventionally, the material was suspended to a determined height by means of cranes and chain blocks, and turned over and finally brought down to the floor.

However, since said manner required difficult throwing of wires onto the object material, and close relationship with crane operators at high positions, many skilled people were also needed for preparation of inverting the object material. Much time was taken for turning over the material bit by bit, and since the working was handled under unstable conditions, the material was sometimes dropped by error.

BRIEF DESCRIPTION OF THE INVENTION

The present invention has been realized to solve the above mentioned shortcomings involved with the prior art.

It is a first object of the invention to provide a device which is installed by a metal mold processing apparatus, a pressing apparatus or the machining apparatus, and may invert the large scale and weighty materials 180° efficiently by one person.

It is a second object of the invention to provide a device which is low in height and simple in structure, and sufficient with a small space for dealing with the material to be inverted.

It is a further object of the invention to provide a device which may carry out the inverting operation with a driving power only, not requiring other special power for accomplishing this purpose, and perform the inversion during elevation concurrently in a short period of time.

For accomplishing these objects, the invention is composed of a stationary table positioned on a bed without using pits, a pair of right and left uprights standing on said table, a pair of right and left slide frames provided on said uprights, means for vertically moving the slide frames, an inverting table provided between said both slide frames and having, at both ends, a central shaft supported by the slide frames, and a means for rotating the central shaft 180° to the maximum.

As a means for vertically moving the slide frames, there is an oil hydraulic cylinder comprising a piston rod and slide frames in connection. Instead, there is a combination of a screw shaft being in mesh with a female screw provided in the slide frames and a motor for driving said screw shaft. In addition, there is another combination of sprockets provided on the upper parts of uprights and a stationary bed, chains mounted on the slide frames at their upper and lower parts via them, and a motor for driving the sprockets. In either case, the left and right slide frames are moved vertically in synchronism.

As a means for rotating a central shaft 180° to the maximum, gears or similar mechanisms are employed. Actually, there is a combination of gears, e.g., worm wheels provided to the central shaft in the slide frames, drive gears, e.g., worms being in mesh with the worm wheels and a motor for driving the worms. There is a further combination of gears, e.g., pinions provided on the central shaft, racks in mesh with the pinions and oil hydraulic cylinders for driving the racks within the slide frames.

A preferable embodiment of this invention utilizes the moving force of the slide frames for moving vertically the inverting table while turning it upside down at the same time, without requiring any special inverting power, by means of a mechanism of transforming the linear movement of the slide frames into the rotating movement of the central shaft. That is, a gear is provided to the central shaft of the slide frame, and a rack to be in mesh with said gear is vertically provided through the height of the slide frame.

The inverting table is sometimes moved vertically only when the upper and lower molds are mated without requiring an inversion, and therefore a clutch means is employed for connecting the inverting table and the central shaft or providing a free relationship therebetween.

As the clutch means, there are selectively adopted those using a movable lock block to be mounted to a flat portion of the central shaft, or a shaft coupling represented by an electro-magnetic clutch.

When the central shaft and the inverting table are free, a lock mechanism is used in order to keep a balance with the slide frames. The lock mechanism may have such a structure where a set cylinder is provided in the slide frame, and a hole to be inserted with a piston rod of the set cylinder is formed in the inverting table. But a convenient mechanism is a combination of a bush furnished in the slide frame, a pin to be supported in said bush and an element for moving said pin. Due to this structure, the inverting table is moved laterally together with the slide frames.

The stationary table includes such a type which has a moving path at least at its front part and mounts the object to be inverted on the stationary table by means of a moving bolster. The stationary table is sometimes provided with a nozzle jetting fluids as the hot water, the steam or the air.

Other objects and structures of the invention will be apparent from later mentioned explanations.

BRIEF DESCRIPTION OF THE DRAWINGS

FIG. 1 is a front view, partially in section, showing a first embodiment of a 180° inverting machine according to the invention;

FIG. 2 is a plan view thereof;

FIG. 3 is a side view thereof;

FIG. 4 is a front view showing a second embodiment of the invention;

FIG. 5 is a plan view thereof;

FIG. 6 is a side view thereof;

FIG. 7 is a front view showing a third embodiment of the invention;

FIG. 8 is a plan view thereof;

FIG. 9 is a side view thereof;

FIG. 10 is a cross sectional view showing one example of an inverting means of the invention;

FIG. 11 is a cross sectional view along XI—XI of FIG. 10;

FIG. 12 is a cross sectional view showing another embodiment of an inverting means;

FIG. 13 is a cross sectional view along XIII—XIII of FIG. 12;

FIG. 14 is a plan view showing one example of an inverting table of the first to third embodiments;

FIG. 15 is a partial, cross sectional view showing usage thereof;

FIGS. 16(a) to 16(d) are explanatory views showing step-wise usages and inversions of the first to third embodiments;

FIG. 17 is a side view of a fourth embodiment of the invention, showing an inverting machine which carries out simultaneously elevation and inversion of the inverting table;

FIG. 18 is a side view thereof;

FIG. 19 is a plan view thereof;

FIG. 20 is a front view of a fifth embodiment of the invention, showing an elevating means different from that of FIG. 17;

FIG. 21 is a side view thereof;

FIG. 22 is a lateral, cross sectional view showing the inverting means of the fourth and fifth embodiments under a clutch-off condition;

FIG. 23 is a cross sectional view along XXIII—XXIII of FIG. 22;

FIG. 24 is a lateral, cross sectional view showing the inverting means of FIG. 22 under a clutch-on condition;

FIG. 25 is a cross sectional view along XXV—XXV of FIG. 24;

FIG. 26 is a lateral, cross sectional view showing another embodiment of the inverting means of the fourth and fifth embodiment;

FIG. 27 is a cross sectional view along XXVII—XXVII of FIG. 26; and

FIGS. 28(a) to 28(d) are cross sectional views showing step-wise usages and inversions of the fourth and fifth embodiments.

THE DESCRIPTION OF PREFERRED EMBODIMENTS OF THE INVENTION

Embodiments of the invention will be mentioned in reference to the attached drawings.

FIGS. 1 to 13 illustrate groups of basic embodiments of the invention, in which FIGS. 1 to 3 show a first embodiment, FIGS. 4 to 6 show a second embodiment and FIGS. 7 to 9 show a third embodiment. In these first to third embodiments, the inversion and the elevation are performed independently.

In FIGS. 1 to 9, a reference numeral 1 is a table fixed to a base 10 without using pits. The table 1 may have such a structure provided with a moving path at least at its front part, as will be seen in a fourth and fifth embodiments, in order to transfer an object material to be inverted by a transferring means. For example, it is a moving bolster.

Numeral 2,2 designate a pair of right and left uprights (columns) installed on the stationary table 1 at a determined height, and front and rear uprights are connected through an upper frame 32 and have a portal shape seen from a side as in FIG. 3. Between the right and left frames 32 may be connected with a crown, but in order to make it easy to handle the object material, an illustrated one is crownless, and an upper part of the stationay table is free in space.

Numerals 3,3 are a pair of right and left slide frames provided on the corresponding uprights 2,2, and the slide frames 3 are vertically moved from the fixed table 1 to a level required to the inversion. The slide frames 3 are box or similarly shaped, and are equipped with set cylinders 42,42 serving as a lock mechanism of an inverting table in order to fix it at a position deviating from the center in width.

Numeral 4 designates an inverting table which is disposed between the pair of right and left slide frames 3,3, and has a bed 9 integrally for holding the object matter to be turned over. The inverting table 4 may comprise a plane block or plane box having interior sections. A simplified structure thereof will be seen in FIG. 14 where shaped steels are welded in parallel or lattice. The bed 9 may comprise a plane material having T grooves to be used in the press machine. A simplified structure is welded on the inverting table with blocks 51 having T grooves 52.

The table 4 protrudes the central shaft 6 at its both sides toward the slide frames 3,3. The central shaft 6 extends their ends 60,60 into the slide frames 3,3 and are rotatably supported by bearings 8,8. Herein, 'central shaft' means, as represented in FIG. 1, that if the side width of the table 4 is 1, the shaft has an axial line at a position of 1/2. The structure is very advantageous in comparison with a manner of turning over the table around a fulcrum of its end portions. The central shaft may be a shaft passing through the table.

Numeral 5 designates means which elevate the slide frames 3,3 and elevate thereby the inverting table 4 via the central shaft 6. The elevating means 5 is not especially limited. The first embodiment uses an oil cylinder, the second embodiment uses a screw shaft mechanism, and the third embodiment uses a chain mechanism.

In the first embodiment, as is seen in FIGS. 1 to 3, oil hydraulic cylinders 11,11 are vertically installed on the fixed table 1 positioned between the right and left uprights 2,2, and piston rods 111,111 of the oil hydraulic cylinders are connected to the slide frames 3,3. For synchronizing the right and left slide frame 3,3, a pair of synchronizing sprockets 12,12 are furnished to the uprights 2,2 and the fixed table 1. Chains 13 are mounted on the sprockets 12,12, and secure the both ends of the chains on the upper and the lower parts of the slide frames 3,3. The right and left sprockets 12,12 are connected by a synchronizing shaft 14. Due to this mechanism, if the pressure oil takes lagging in flowing in either of the right or left cylinders 11,11, the lagging is automatically controlled by the sprockets 12,12, the chains and the shaft 14, and consequently the slide frames, 3,3 and the inverting table 4 are balanced.

In the second embodiment, as seen in FIGS. 4 to 6, female screw members 15,15 are integrally provided to the slide frames 3,3 at the outsides thereof, and screw shafts 16,16 pass through said female screw members 15,15. The screw shafts 16 are supported by the upper frames 32 at the heads. In the fixed table 1, a driving shaft 19 is laid, having bevel gears 18,18 being in mesh with bevel gears 17,17 at the lower ends of said screw shafts 16, 16. The driving shaft 19 is to be driven by a reversible motor 20 having a check function of rapid dropping, for example, a worm reduction motor.

In the third embodiment, as seen in FIGS. 7 to 9, pairs of elevating sprockets 21,21 are provided at the outside, upper portions of the uprights 2,2 and at the corresponding side lower positions of the fixed table 1. Elevating chains 22,22 are mounted on the sprockets 21,21, and both their ends are secured at upper and lower parts of the slide frames 3,3. In the fixed table 1, a driving shaft 19 is laid, and right and left elevating sprockets 21,21 are secured to the driving shaft 19 which is to be rotated by a reduction motor 20.

A numeral 7 seen in FIG. 3 designates a means for turning over at the maximum 180° the inverting table 4 and the matter to be inverted thereon. The inverting means 7 uses gears or similar mechanisms. FIGS. 10 to 13 show real examples thereof.

FIGS. 10 and 11 are an example using a pinion truck and an oil pressure cylinder, one side of which is shown. Within the slide frame 3, a pinion 23 is secured to the central shaft 6 at its end portion 60, and a piston 24 is laterally secured in a direction crossing with said pinion 23. The piston 24 is centrally provided with a fixed head 240, around which is disposed an oil hydraulic slide cylinder 26 having a rack 25 to be in mesh with said pinion 23. This cylinder 26 is slided in length of the piston 24 supplying the oil thereinto, and the pinion 23 is rotated by means of the rack 25 clockwise or counterclockwise, and accordingly the central shaft 6 securing the pinion 23 is rotated.

FIGS. 12 and 13 illustrate an embodiment using a reduction gear where a worm wheel (or a bevel gear) 27 is fixed on the end portion 60 of the central shaft 6, and a slide frame 3 is provided with a worm (or a bevel gear) 28 to be meshed with said worm wheel 27 and a reversible motor 29 to drive the worm 28.

FIGS. 17 to 27 illustrate groups of the preferable embodiments of this invention. FIGS. 17 to 19 are a fourth embodiment, and FIGS. 20 to 21 are a fifth embodiment. These embodiments perform the inversion and the elevation of the inverting table 4 concurrently.

The fixed table 1 is placed on the base 10 without pittings, and the table 1 is laid at least at the front part thereof with a moving path 30 comprising rails, and a moving means 31 such as the moving bolster is disposed on the fixed table 1.

Numerals 2,2 designate a pair of right and left uprights of a portal shape via an upper frame 32. Between the uprights the front sides are connected by a beam 33 which may be omitted.

Numerals 3,3 designate the pair of left and right slide frames, and the illustrated ones are penetrated with the uprights 2,2, and they are guided thereby. Numeral 4 shows the inverting table provided between the slide frames 3, which is so designed and sized that it is made horizontal above the fixed table 1 when it is turned over, and which laterally extends the central shaft 6 and is supported at end portions 60,60 by bearings 8,8 of the slide frames 3,3.

Numeral 5 designates means for elevating the slide frames 3,3 along the uprights 2,2. FIGS. 17 to 19 show an example of using the oil pressure cylinder, and FIGS. 20 and 21 show an example of using a screw shaft. Since the actual mechanisms are the same as the first and second embodiments, the same numerals are applied. A synchronization driving mechanism of the screw shaft is disposed to the lateral beam 33, and it may be of course disposed to the fixed table 1. Also, the screw shaft driving mechanism may use a chain drive system as seen in the third embodiment.

The fourth and fifth embodiments are characterized in that the elevating force of the elevating means is utilized to provide a rotating means 7a for rotating the central shaft 6 of the inverting table 4.

To state it in detail, rotation means 7a comprise, as seen in FIGS. 17, 21 and 22, gears 34,34 mounted on the end portions 60,60 of the central shaft 6 within the slide frames 3,3, and longitudinal racks 35,35 to be in mesh with the gears 34,34. The longitudinal racks 35 extend in height of the slide frames 3 and are provided between upper frames 32 and the fixed table 1.

Depending upon such a structure, when the slide frames are elevated by driving the elevating means 5,5, the central shaft 6 is also elevated together. Since the gears 34,34 mounted on the central shaft 6 are rotated thereby, the central shaft 6 and the inverting table 4 are automatically tilted during elevation.

However, it is inconvenient to depend upon this structure only, for example, when mating the molds. Thereupon, in the present invention, the inverting table 4 is moved vertically without turning it over. In order to realize such a fact, the central shaft 6 and the inverting table 4 are united into a one body, otherwise a clutch means is equipped to provide relatively free relationship.

FIGS. 22 to 25 illustrate an example adopting a lock block mechanism as said clutch means. The central shaft 6 of the inverting table 4 is formed with a flat portion 36, while the slide frames 3,3 are secured with guide metals 37,37 at positions holding the flat portion 36 therebetween, and a lock block 38 is movable between the guide metals 37, which has a jaw to hold the flat portion 36.

The moving mechanism of the lock block 38 may be a cylinder and in the present embodiment it is a screw bar 39 passing through a female screw hole of the lock block 38 and a drive source 40 such as a handle for rotating said screw bar or a motor.

On the other hand, the clutch means of FIGS. 26 and 27 is divided into a stationary shaft 6a securing the central shaft 6 to the inverting table 4, and movable shafts 6b extending into the slide frames 3,3. Said members 6a and 6b are connected via electromagnetic or sliding clutches 41.

Further, the lock mechanism is installed in order to unite the slide tables 3 and the inverting table 4, when the latter 4 and the central shaft 6 are free and non-turning over. The lock mechanism may depend upon the set cylinders 42,42, and in the present embodiment, bushes 43 are provided to the slide frames 3, and the inverting table 4 is movably provided with lock pins 44 at positions corresponding to said bushes 43,43. The lock pin should be square in cross section.

As the moving mechanism of the lock pins 44, in FIGS. 22 to 25, a driving gear 45 is secured at the center portion of a screw bar 39 moving the lock block 38. The lock pins 44 are screwed with short screw shafts 47 having gears 46 to be in mesh with said driving gear 45. In this structure, a single power source may undertake connection and separation of the clutch as well as locking and unlocking thereof. In FIG. 27, a front portion from the driving gear 45 is taken off.

In other figures of the drawings, numeral 48 designates cover attaching members for cleaning the metal mold, which are to be provided at the uprights 2. Numeral 49 designates nozzles to be equipped at the stationary table 1 as requested, which jet steam, hot water or air.

A further reference will be made to usage and work of the 180° inverting machine.

The present machine is pitless, and is positioned with the stationary table 1 by an apparatus or facility such as the metal processing apparatus, the press apparatus or the resin forming apparatus. Being pitless, its provision is easy, and being low in height, smallest space is sufficient for operation.

The object matter to be turned over is transferred to the stationary table by means of a transferring means such as a forklift, a truck or a moving bolster, and is fixed on the descended inverting table 4. This is lifted from the table 1 by raising the slide frames 3 by means of the elevating means 5, and is turned over 180° to the maximum via the inverting table 4 by rotation of the central shaft 6 by means of the rotation means 7.

The matter is fixed on the inverting table 4 by the bed 9. For example, as seen in FIG. 15, T-groove 52 of the bed 9 is applied with T-bolt 53, and it is positioned around the matter and is fastened by a fastening means 54 such as a nut.

Taking up as example, cleaning, washing, checking and repairing of the single metal mold with respect to the first and third embodiments, the object matter W is, as seen in FIG. 16a, carried to the stationary table 1. Then, the inverting table 4 with the bed 9 facing upward, is stationary on the fixed table 1.

In the first embodiment, the slide frames 3 are automatically brought down along the uprights 2 by getting out the oil. In the second embodiment, the slide frames 3 are descended by the rotation of the drive shaft 19 by the drive motor 20, and by the rotation of the screw shaft 16,16 by the bevel gears 17,18 through the female members 15,15. In the third embodiment, the slide frames 3 are moved down by the rotation of the drive shaft 19 and the elevating sprockets 21 by driving a reduction motor 20 via chains 22,22.

In either case, since the central shafts 6,6 are supported by the slide frames 3, the inverting table 4 is also brought down together.

The material W is fixed on the bed 9 of the inverting table 4 by the shown manner. The elevating means 5 is driven in an opposite direction, and the slide frames 3 are raised. Thereby the material W is, as illustrated in FIG. 16b, fixed on the table 4 and lifted.

When the inverting table 4 comes uppermost, the rotation means 7 is actuated. In the embodiment shown in FIG. 10, a sliding cylinder 26 is supplied with the oil and moved along a piston 24. Since the sliding cylinder 26 is secured with a rack 25, the rotation force is give to the pinion 23—the central shaft 6, and the inverting table 4 begins to tilt. In the embodiment of FIG. 12, the rotation is transmitted from the worm 28 to the worm wheel 27 by the inverting motor 29, and the inverting table 4 begins to tilt as shown in FIG. 16(c).

The inverting table 4 is rotated around its center, and an inverting torque may be made large since the table is not rotated around its edge, and it is possible to maintain precision for a long period of time. In a case of rotating the table 4 around the edge, the table 4 is stretched to the rear side of the stationary table, and the stationary table requires a large space therefor. But in the present invention, the stationary table 1 has almost the same size as the inverting table and does not require an unnecessary space.

Since the material W is faced downward by rotating the inverting table 4 180°, necessary treatments such as cleaning, washing or other may be performed. This work may be carried out, as shown in FIG. 16(d), by spreading covers over the uprights with cover equipping members 48,48 and jetting the fluid through nozzles 49 of the stationary table 1.

When the necessary work is finished, the material W is turned over and placed on the stationary table, and is transferred by the transferring means.

When the two molds are overlapped on each other as an upper-lower type, the object material placed in the upper and the lower members is positioned on the stationary table 1 by means of the transferring means, and the inverting table 4 is moved down with the bed facing downwards, and said upper member on the object is secured to the bed, and the inverting table is moved upward. The upper member is thereby separated from the lower member and is brought up, and subsequently the lower member is transferred from the stationary table to the outside by the transferring means, and the inverting table is turned over. Thus since the upper member of the object is faced upwardly and if it is moved down as it is, the upper member facing upward is positioned at the same level as the lower member. Therefore, the processing, repairing, checking or cleaning are easily carried out. The upper member is separated from the lower member and is moved by removing the upper member from the bed and moving by the transferring means.

A further reference will be made to usage and actuation of the fourth and fifth embodiments with an example of the metal mold shown in FIGS. 28(a) to 28(d). The transferring path laid to the fixed table 1 is provided with a moving means 31 such as the moving bolster, on which an upper metal mold W1 and a lower metal mold W2 are overlapped, and they are charged to the fixed table 1 by moving the moving means 31 (FIG. 28(a)).

When those molds come to a determined position of the fixed table 1, the inverting table 4 upheld is brought down by moving the right and left slide frames 3,3 along the uprights 2,2 by the elevating means 5.

This descending movement is performed by extracting the oil from the oil pressure cylinder in the embodiment illustrated in FIGS. 17 to 19, and by driving the motor 20 and rotating the screw shafts 16,16 via the drive shaft 19 and the bevel gears 17, 18 in the embodiment illustrated in FIGS. 20 and 21.

When the descending movement is performed, the inverting table 4 and the contral shaft 6 are made free by the clutch means. If the clutch means is a lock block mechanism, the screw bar 39 is, as seen in FIGS. 22 and 23, rotated until the lock block 38 is separated from the flat portion 36 of the central shaft 6. The central shaft 6 passing through the inverting table 4 is possible in free rotation. At the same time, by the rotation of the screw bar 39, the gears 46,46 in mesh with the gear 45 are rotated and since the screw shafts 47,47 are rotated accordingly, the lock pins 44,44 go forward into the bushes 43,43 of the slide frames 3,3 so that the slide frames and the inverting table are locked.

In FIGS. 26 and 27, the clutches 41,41 are turned off, so that the relationship between the fixed shaft 6a and movable shafts 6b,6b is cancelled, and the latters 6b are free in rotation with respect to the inverting table 4. In this case, the driving gear 46 is rotated independently, and the slide frames and the inverting table are connected by lock pins 44,44.

In either case, if the slide frames 3,3 are moved down by the elevating means 5,5, the gears 34,34 mounted on the central shaft 6 are rotated by the longitudinal racks 35,35 passing through the slide frames 3,3, and the central shaft 6 is rotated accordingly, but since the central shaft 6 is free with respect to the inverting table 4, it is idle in rotation and the rotation is not transmitted to the inverting table 4. The slide frames 3 and the inverting table 4 are united by the lock mechanism. Therefore, the inverting table is brought down as it is balanced with the slide frames 3,3.

When the table 4 is brought down, the bed 9 is positioned thereunder. Then, the metal mold (upper one) is secured on the bed 9, and the slide frames 3 are moved up by actuating the elevating means 5,5. Thereby the metal mold W1 is vertically upheld by the inverting table 4 (see FIG. 28(b)). If the elevating means 5,5 are actuated under this condition, the metal mold W1 is moved down, and the mating of the molds may be taken by the metal mold W2 and the resin is jetted by trial if required.

In turning over the metal mold W1 for finishing the mold, dismantling or maintenance, the inverting table 4 securing the metal mold W1 is moved upwardly, and subsequently the metal mold W2 is transferred from the fixed table to the transferring path 30 by means of the transferring means 31. The lock mechanism of the inverting table 4 positioned uppermost and the slide frames 3,3 is released, and the clutch means is turned ON, so that the inverting table 4 and the central shaft 6 are united.

In a case of the lock block mechanism, the screw bar 39 is rotated reversely to the above mentioned direction by the handle or the motor, and the screw shafts 47 are rotated by the rotation of the gears 46,46 in mesh with the gear 45. Since the lock pins 44 are slipped out from the bushes 43 of the slide frames 3, the slide frames 3 are separated from the inverting table 4. At the same time, due to the rotation of the screw bar 39, the lock block 38 goes forward along the guide metals 37 and contacts to the flat portion 36 of the central shaft 6.

When the gear 45 is rotated, the clutches 41,41 are turned ON, and when the lock pins 44,44 are retreated, a fixed shaft 6a is connected to movable shafts 6b,6b, and the central shaft 6 and the inverting table 4 are united.

If the elevating means 5,5 are actuated, the slide frames 3,3 are moved downwardly, and at the same time the gears 34,34 are rotated by the vertical racks 35,35 passing through the slide frames 3. By the rotation of the gears 34,34, the central shaft 6 is rotated, but in this case since the central shaft 6 and the inverting table 4 are united, the inverting table 4 is, as shown in FIG. 28(c), turned over as descending, and is, as shown in FIG. 28(d), brought to the fixed table 1 under the condition of 180° inversion.

Under such a condition, the necessary process or treatment may be undertaken as the worker looks downwardly. If the elevating means are operated when said process or treatment is accomplished, the inverting table 4 is moved upwardly as it is turned over.

Since the inverting table is rotated around the center, the inverting torque is large without requiring a space. Besides, since the descending and the turning-over can be carried out simultaneously, a short time is enough for the inversion. Further any special driving power source is not required for the inversion.

When the inverting table 4 comes uppermost, and if the metal mold W2 is brought to the fixed table 1 and the elevating means 5 are actuated while the clutch means are turned OFF, the molds may be easily mated. For dismantling the metal molds, it is sufficient to transfer the metal mold W1 by means of an appropriate means, while it is turned over as depicted in FIG. 28(d). For example, if the crane is used, the work is easily accomplished, since the upper part between the uprights 2,2 is free.

In addition, in the first to the fifth embodiments, the inverting table may be tilted at any angle until 180°, and may be maintained at a required angle.

What is claimed is:

1. An inverting machine for inverting metal molds 180° for finishing, assembling, dismantling, checking, repairing, and cleaning thereof, the inverting machine comprising:

a base;

a stationary table positioned on said base and having two lateral sides;

a pair of portal uprights mounted on and extending upwardly from said table on each of said sides;

two slide frames each slidably movable along a respective pair of said uprights;

means for vertically moving said slide frames relatively to said uprights;

an inverting table having a fixed securing element for holding a metal mold to be inverted and extending between said slide frames, said inverting table being arranged in opposition to said stationary table and having two opposite sides each with a width;

a central shaft having ends and being pivotally supported by said slide frames at said ends and extending from a center of said width of each side of said inverting table;

means for rotating said ends of said central shaft to rotate the inverting table about said central shaft;

clutch means located between said central shaft and said inverting table for selectively making and breaking connection between said central shaft and said inverting table; and locking means for connecting said inverting table with said slide frames when said connection is broken by said clutch means, said locking means being located between said inverting table and said slide frames.

2. An inverting machine as defined in claim 1, wherein means for rotating the central shaft are gears mounted on the central shaft within the slide frames and racks to be meshed with said gears.

3. An inverting machine as defined in claim 1, wherein the means for vertically moving the slide frames and the means for rotating the central shaft are actuated independently by means of independent driving sources, and the inverting table is turned and moved down.

4. An inverting machine as defined in claim 1, wherein the pair of uprights allow instruments to enter therebetween.

5. An inverting machine as defined in claim 1, wherein a transferring path is laid at least in front of the stationary table for transporting the metal mold.

6. An inverting machine as defined in claim 1, wherein said central shaft has an outer circumference, said rotating means including first gears provided on said outer circumference of said central shaft and second gears provided on said slide frames and means for driving said second gears including a reversible power source, said second gears being formed and arranged to mesh with said first gears.

7. An inverting machine as defined in claim 1, wherein said vertical moving means and said rotating means are formed so as to vertically move and to pivot said central shaft concurrently.

8. An inverting machine as defined in claim 7, wherein said central shaft has an outer circumference, said rotating means and said vertical moving means having common elements including gears provided on said outer circumference of said central shaft and vertical racks passing through said slide frames between said upright and said stationary table, said vertical racks being formed and arranged to mesh with said gears.

9. An inverting machine as defined in claim 1, wherein said vertically moving means includes an oil hydraulic cylinder.

10. An inverting machine as defined in claim 1, wherein said vertically moving means includes screw shaft means.

11. An inverting machine as defined in claim 1, wherein said vertically moving means includes chain means.

12. An inverting machine as defined in claim 1, wherein said securing element on said inverting table is formed as a T-groove.

13. An inverting machine as defined in claim 1, wherein said rotating means is formed to pivot said ends to said central shaft to rotate said inverting table 180° maximum.

14. An inverting machine as defined in claim 1, wherein said inverting table has a first face with said securing element and a second face opposite said first face, said inverting table being movable downwardly such that said first side is contactable with said stationary table and said inverting table then being movable upwardly and rotatable relatively to said stationary table such that said first face no longer faces said stationary table, said inverting table also being movable to a predetermined position spaced away from said stationary table with said first side facing downwardly and then being movable upwardly and rotatable relatively to said stationary table such that said first face no longer faces said stationary table and then being movable downwardly, said inverting table also being movable vertically with said first face alternately facing upwardly, laterally, or downwardly.

15. An inverting machine for inverting metal molds 180° for finishing, assembling, dismantling, checking, repairing, and cleaning thereof, the inverting machine comprising:
a base;
a stationary table positioned on said base and having two lateral sides;
a pair of portal uprights mounted on said table and extending upwardly from each of said sides;
two slide frames each slidably movable along said uprights;
means for vertically moving said slide frames relatively to a respective pair of said uprights;
an inverting table having a T-groove for holding a metal mold to be inverted and extending between said slide frames, said inverting table being arranged in opposition to said stationary table and having two opposite sides each with a width;
a central shaft having ends and being pivotally supported by said slide frames at said ends and extending from a center of said width of each side of said inverting table, said central shaft having an outer circumference;
clutch means located between said central shaft and said inverting table for selectively making and breaking connection between said central shaft and said inverting table;
first gears provided on said outer circumference of said central shaft;
second gears provided on said slide frames and being formed and arranged to mesh with said first gears; and
means for driving said second gears including a reversible power source, said stationary table being arranged so as to provide for a path for transporting the metal mold in front of at least said stationary table.

16. An inverting machine as defined in claim 15, wherein said vertically moving means includes an oil hydraulic cylinder.

17. An inverting machine as defined in claim 15, wherein said vertically moving means includes screw shaft means.

18. An inverting machine as defined in claim 15, wherein said vertically moving means includes chain means.

19. An inverting machine for inverting metal molds 180° for finishing, assembling, dismantling, checking, repairing, and cleaning thereof, the inverting machine comprising:
a base;
a stationary table positioned on said base and having two lateral sides;
a pair of portal uprights mounted on and extending upwardly from said table on each of said sides;
a pair of slide frames slidably movable along said uprights;
means for vertically moving said slide frames relatively to said uprights;
an inverting table having a T-groove for holding a metal mold to be inverted and extending between said slide frames, said inverting table being arranged in opposition to said stationary table and having two opposite sides each with a width;
a central shaft having ends and being pivotally supported by said slide frame at said ends and extending from a center of said width of each side of said inverting table, said central shaft having an outer circumference;
gears provided on said outer circumference of said central shaft; and
vertical racks passing through said slide frames between said uprights and said stationary table, said vertical racks being formed and arranged to mesh with said gears;
clutch means located between said central shaft and said inverting table for selectively making and breaking connection between said central shaft and said inverting table; and
locking means for connecting said inverting table with said slide frames when said connection is broken by said clutch means; said stationary table being arranged so as to provide for a path for transporting the metal mold in front of at least said stationary table.

20. An inverting machine as defined in claim 19, wherein said vertically moving means includes an oil hydraulic cylinder.

21. An inverting machine as defined in claim 19, wherein said vertically moving means includes screw shaft means.

22. An inverting machine as defined in claim 19, wherein said vertically moving means includes chain means.

* * * * *